Figure 1:
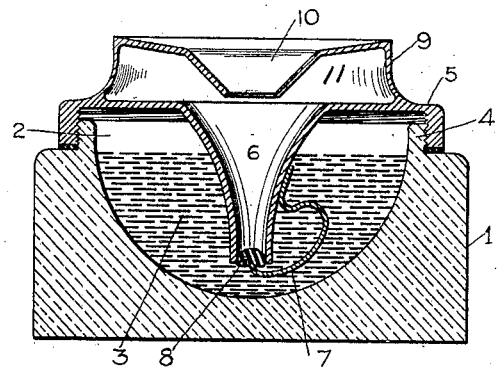

No. 876,726. PATENTED JAN. 14, 1908.
W. W. OWENS.
INK WELL.
APPLICATION FILED MAY 27, 1907.

WITNESSES:

INVENTOR
W. W. OWENS.

BY

Attorneys

UNITED STATES PATENT OFFICE.

WILLIAM W. OWENS, OF GLENCOE, OHIO.

INK-WELL.

No. 876,726.  Specification of Letters Patent.  Patented Jan. 14, 1908.

Application filed May 27, 1907. Serial No. 375,860.

*To all whom it may concern:*

Be it known that I, WILLIAM W. OWENS, a citizen of the United States of America, residing at Glencoe, in the county of Belmont and State of Ohio, have invented certain new and useful Improvements in Ink-Wells, of which the following is a specification, reference being had therein to the accompanying drawing.

This invention relates to ink wells, and the invention has for its object to provide an ink well with a novel closure for preventing the contents of the well from being spilled when the well is accidentally tilted or upset.

Another object of this invention is to provide an ink well wherein novel means is employed for preventing the entire contents of the well from evaporating or being destroyed by dust and foreign matter settling in the same.

A further object of this invention is to provide a simple and inexpensive ink well that can be easily and quickly filled, emptied or cleansed.

With the above and other objects in view, the invention consists in the novel construction, combination and arrangement of parts to be hereinafter more fully described and then specifically pointed out in the appended claims.

Figure 2:
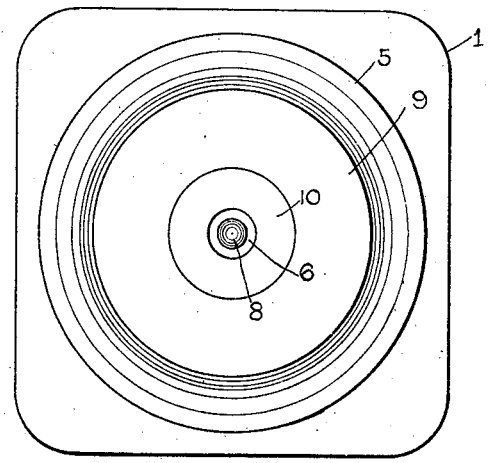

Referring to the drawing forming part of this specification, like numerals of reference designate corresponding parts throughout the several views, in which:

Figure 1 is a vertical sectional view of the ink well, and Fig. 2 is a plan of the same.

To put my invention into practice, I construct the body 1 of my improved ink well of vitreous material as glass, and provide the same with a semi-spherical concavity 2, serving functionally as a receptacle for writing fluid or ink 3. The upper edges of the concavity 2 terminates in an annular exteriorly threaded flange 4 carried by the body of the ink well, and upon the flange is detachably secured the closure or cap structure of the ink well.

The closure consists of a cap 5 adapted to screw upon the flange 4, said cap being provided with a central depending funnel 6 extending in close proximity to the bottom of the concavity 2. The funnel 6 is provided with a resilient arm 7, carrying a valve 8 normally closing the lower end of the funnel 6. The valve is preferably constructed of rubber or similar material.

The closure is provided with an annular enlargement 9 having a central depending funnel 10 alining vertically with the funnel 6, said annular enlargement 9 providing an auxiliary receptacle 11 for the contents of the funnel 6, should the ink well be tilted or upset.

A pen is placed through the funnel 10 into the funnel 6 and upon pressing upon the pen, the valve 8 will be lowered to allow a certain quantity of writing fluid or ink to enter said funnel. Immediately upon the pen being withdrawn, the valve 8 closes the funnel, allowing a certain quantity of ink or writing fluid to remain in the funnel 6. Should the ink well be upset the fluid in the funnel 6 flows into the receptacle 11 while the fluid in the concavity 2 is retained therein by the cap 5.

The closure of the ink well is preferably constructed of light and durable non-corrosive metal.

What I claim and desire to secure by Letters Patent, is:—

In an ink well, a body having a semispherical concavity formed therein, a closure removably secured upon said body over said concavity, said closure comprising a cap, a centrally depending funnel, a resiliently supported valve carried by the funnel and movable into and out of the lower end thereof, said valve normally closing the funnel, an annular enlargement carried by said cap, and a depending funnel carried by said enlargement and alining with the first mentioned funnel, said enlargement and its funnel being located above the plane of the body of the cap, said enlargement being removable with the cap as a unitary structure.

In testimony whereof I affix my signature in the presence of two witnesses.

WILLIAM W. OWENS.

Witnesses:
 J. D. BENNETT,
 T. W. MELLOTT.